Aug. 16, 1949.                W. J. SEIGEL                 2,479,139
                         LUBRICANT SERVICING UNIT
Filed June 9, 1943                                         3 Sheets-Sheet 1

INVENTOR
William J. Seigel
BY
Arthur C. Brown
ATTORNEY

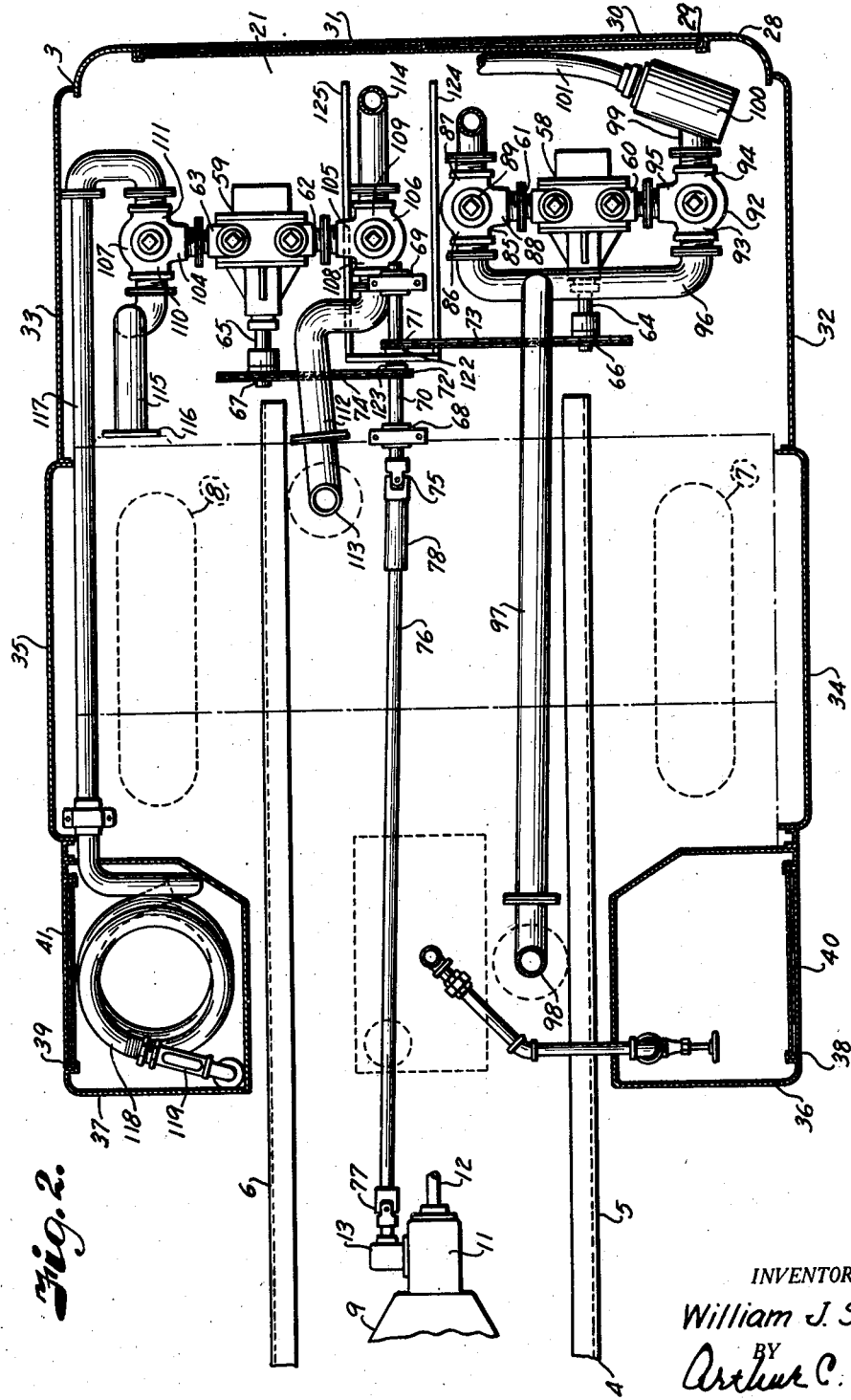

Aug. 16, 1949.　　　　W. J. SEIGEL　　　　2,479,139
LUBRICANT SERVICING UNIT
Filed June 9, 1943　　　　　　　　　　3 Sheets-Sheet 3
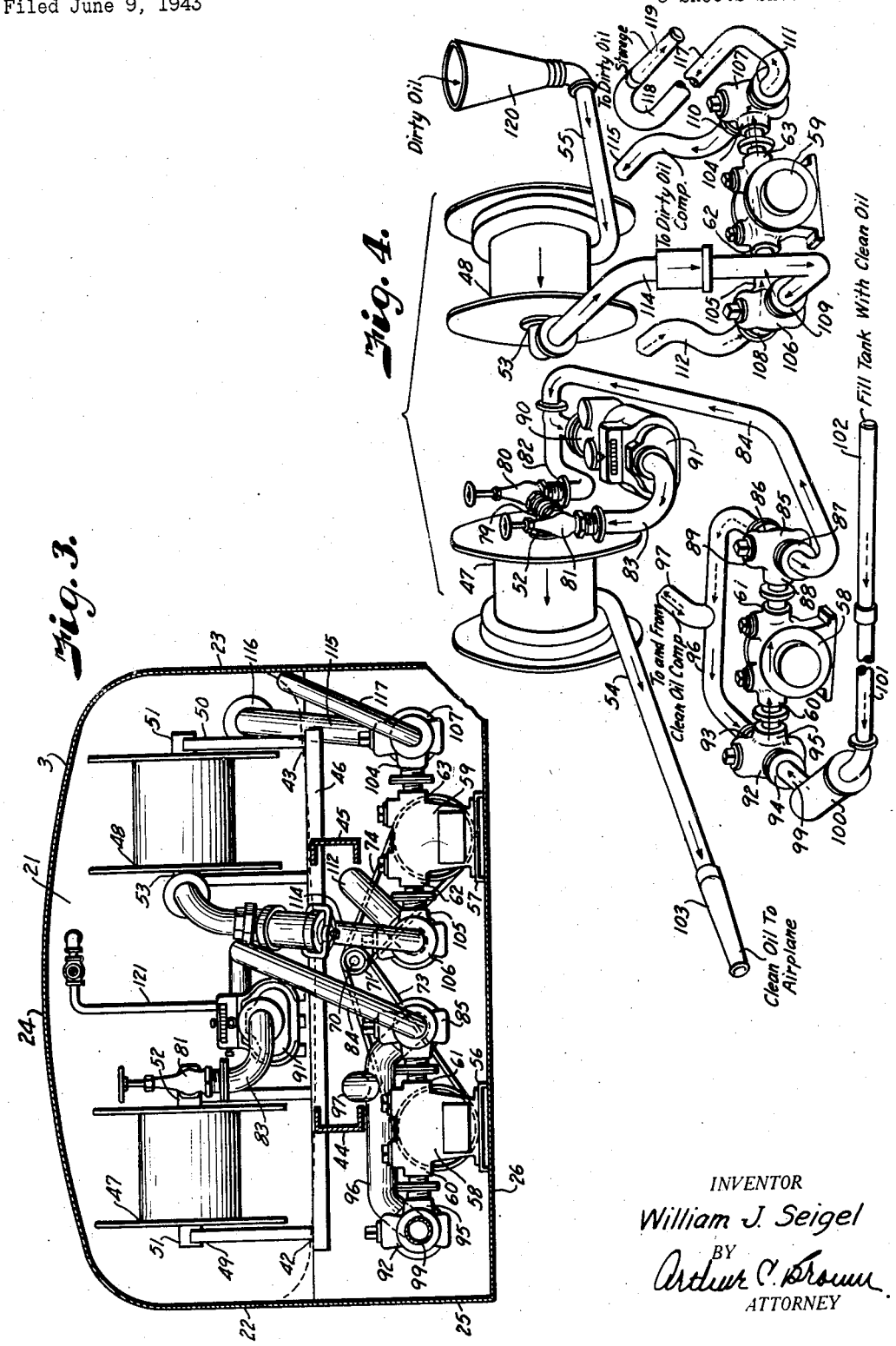
INVENTOR
William J. Seigel
BY
Arthur C. Brown
ATTORNEY Patented Aug. 16, 1949

2,479,139

UNITED STATES PATENT OFFICE 2,479,139

LUBRICANT SERVICING UNIT

William J. Seigel, Kansas City, Mo., assignor to Standard Steel Works, North Kansas City, Mo., a corporation of Missouri Application June 9, 1943, Serial No. 490,123

2 Claims. (Cl. 184—1.5)

This invention relates to a portable lubricating unit for servicing aircraft and other lubricant-using equipment that is not readily maneuverable to a lubricating station, but must have the lubricating service brought to it.

The principal object of the invention is to provide a mobile unit of this character whereby such equipment may be easily and quickly serviced. Other objects of the invention are to provide a mobile unit equipped to remove the used oil and to supply clean oil without contamination by the used oil; to provide a power driven assembly which includes a tank having separate compartments for the clean and used oils, pumps and operating connections completely assembled and shipped from the factory as a unit so that it is readily applied on a motor vehicle chassis; to provide a driving connection for the pumping equipment which simply requires connection with a power take-off of the chassis, and to provide a lubricant transfer system having relatively few valves which must be actuated when changing from one servicing operation to another.

In accomplishing these and other objects of the invention, I have provided improved structure, the preferred form of which is illustrated in the accompanying drawings, wherein:

Fig. 2 is a horizontal section through the lower portion of the unit.

Fig. 3 is a cross sectional view on the line 3—3 of Fig. 1.

Fig. 4 is a diagrammatic perspective view of the clean and used oil transfer systems.

Figure 1:
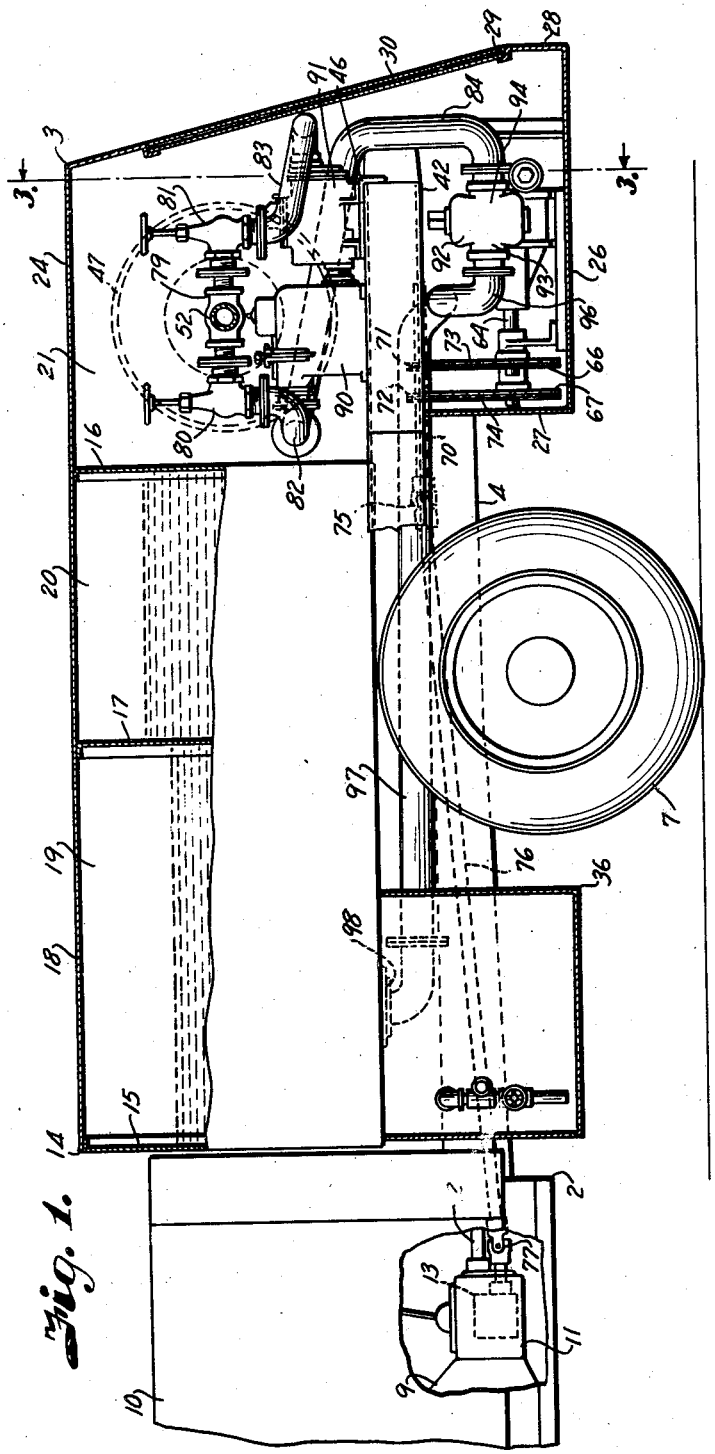
Fig. 1 is a side elevational view of a portion of a mobile oil servicing unit embodying the features of the present invention, parts of which are broken away and shown in section to better illustrate the construction thereof.

Referring more in detail to the drawings:

1 designates a mobile lubricant servicing unit embodying the features of the present invention and which includes a motor vehicle chassis 2 mounting a lubricant servicing assembly 3. The chassis 2 may be an ordinary small delivery truck chassis including a frame 4 having longitudinal side members 5 and 6 supported at the rear by wheels 7 and 8 that are operated by an internal combustion engine 9 mounted on the front end of the chassis. The chassis also includes front steering wheels, not shown, and a driver's compartment or cab 10. The motor 9 includes the usual speed change transmission 11 which is connected with the wheels 7 and 8 by a propeller shaft 12. The transmission also has a power take-off connection 13 for the purpose later described.

The unit assembly 3 includes a horizontally arranged tank 14 which in the illustrated instance consists of front and rear heads 15 and 16, an intermediate bulkhead or partition 17 and a wall sheet 18 that is fixed thereto to provide liquid-tight compartments 19 and 20. Preferably formed as an integral part of the tank is a rear compartment 21 formed as rearward continuations of the corresponding walls of the tank, and the side walls have depending skirt portions 25 carrying a bottom or floor 26. The floor 26 is connected with the bottom of the tank by a forward wall 27 and the rear end of the compartment 21 is closed by a wall 28 having a door opening 29 closed by doors 30 and 31 that may be hinged to the sides of the opening so that they swing outwardly from the compartment 21.

The top of the tank may be provided over the respective compartments 19 and 20 with suitable manholes provided with vents for admitting and discharging air from the compartments as the compartments are emptied and filled with used and clean lubricating oil, as later described. If desired, the lower sides of the tank, including the rear compartment, may be provided with side skirt portions 32 and 33 having housings 34 and 35 covering the rear wheels. The skirt portions may also be provided with compartments 36 and 37 at the front of the tank having side door openings 38 and 39 closed by doors 40 and 41, which compartments may be utilized for storing of hose and various lubricating accessories.

Mounted within the rear compartment are spaced frames 42 and 43 having channel portions 44 and 45 spaced above the floor portion 26 of the compartment to mount a horizontal platform-like support 46. The support 46 carries hose reels 47 and 48 that are journalled in bearing brackets 49 and 50 fixed to the support 46 and having bearings 51 journaling the ends of the reel shafts. The facing ends of the reel shafts project beyond the bearings 51 and are arranged to form swivel connections with pipe fittings 52 and 53. The shafts are also connected with hose 54 and 55 that are mounted on the respective reels so that they may be withdrawn therefrom and extended through the rear door of the compartment.

Mounted on suitable bases 56 and 57 carried on the floor 26 of the compartment 21 are pumps 58 and 59 having suction and discharge connections 60—61 and 62—63 respectively. The pumps have operating shafts 64 and 65 extending forwardly within the compartment and carrying sprocket wheels 66 and 67. Supported, for example, from the platform 46 at a point intermediate the pumps are spaced bearing brackets 68 and 69 journaling a countershaft 70 which carries sprockets 71 and 72 aligning with the sprockets 66 and 67. Operating over the aligning sprockets are endless chain belts 73 and 74 whereby both pumps are driven from the countershaft 70. The rear end of the countershaft projects forwardly through the wall 27 and is connected by a universal joint 75 with a shaft 76 extending forwardly of the chassis to connect with the power take-off 13 by means of a flexible joint 77. One of the flexible joints, for example 75, may be provided with a sleeve 78 telescoped over the rear end of the shaft 76 and having a driving connection therewith. With this arrangement the pumps are operated by the motor of the vehicle chassis through the power take-off connection of the transmission.

The fitting 52 for the hose reel 47 includes a T 79 having the branches thereof connected with valves 80 and 81 which in turn connect with pipes 82 and 83, the pipe 83 being connected with a pipe 84 which connects with the discharge connection 61 of the pump 58 through a three-way valve 85. The valve 85 has discharge connections 86 and 87 and an inlet connection 88 which are controlled by a rotatable plug 89.

The discharge end of the pipe 84 connects with an air eliminator 90 which is connected with a flow measuring meter 91 whereby lubricant discharged by the pump is measured as to quantity, the discharge of the flow meter being connected directly with the pipe 83. The inlet connection 60 of the pump 58 is connected with a three-way valve 92 having inlets 93 and 94 and an outlet 95, the outlet being connected with the inlet of the pump. The inlet connections 93 and 88 of the valves 85 and 92 are interconnected by a manifold 96, which in turn is connected by a pipe 97 with the bottom of the compartment 19 as indicated at 98, Figs. 1 and 2. The inlet connection 94 for the valve 92 is connected by a pipe 99 with a filter 100, which in turn is connected with a hose 101 having a suction nozzle 102 on the free end thereof adapted to be connected with a source of clean lubricating oil.

The discharge end of the hose 54 is provided with a similar nozzle 103 that is adapted to connect with the oil inlet connection of the oil supply for the airplane motor to be serviced, as later described. The inlet and discharge connections of the pump 59 are similarly connected by the discharge and inlet connections 104 and 105 of three-way valves 106 and 107. The valves also have inlet connections 108—109 and outlet connections 110—111 respectively. The inlet connection 108 of the valve 106 is connected by a pipe 112 with the bottom of the compartment 20, as indicated at 113, Fig. 2. The inlet connection 109 of the valve 106 is connected by a pipe 114 with the L fitting 53 which has connection with the shaft of the reel 48.

The discharge connection 110 of the valve 107 is connected by a pipe 115 with the end of the compartment 20, as indicated at 116, Fig. 2. The outlet connection 111 of the valve 107 connects with a pipe 117 which leads forwardly of the tank and terminates within the compartment 37 to connect with a hose 118 that is stored therein, and which is provided with a nozzle 119 on the free end thereof. The hose 55 on the reel 48 has the free end thereof provided with a funnel 120 that is adapted to be supported by a suitable tripod under the oil drain connection of the aircraft motor, not shown.

The air eliminator may be connected by a vent duct 121 with the top of the used oil compartment as shown in Fig. 3. It is obvious that the pumps, piping systems, individual hose reels and the countershaft are all mounted within the rear compartment 21 and may be completely assembled at the factory with all of the various fittings, including the hose, attached and contained in their respective positions so that the entire assembly may be shipped as a unit from the factory and installed on the chassis of a vehicle merely by securing the unit thereon and connecting the shaft 76 with the power take-off of the vehicle.

In order that the pumps may be independently and selectively operated the sprockets 71 and 72 are provided with clutches 122 and 123 which are operated by rods 124 and 125.

In using a servicing unit constructed and assembled as described, the clean oil compartment 19 is filled as follows:

The hose 101 is withdrawn through the door opening 29 and the nozzle 102 thereof connected with a source of lubricant supply; for example, a barrel, not shown. The power take-off is then made effective so that the shaft 76 is rotated to actuate the countershaft 70. The rod 125 is then operated to shift the clutch 122 into driving connection with the sprocket 72 to actuate the pump 58. The three-way valve 92 is then adjusted so that the inlet connection 94 thereof is in communication with the discharge connection 95, and the discharge connection 86 of the valve 85 is in communication with the inlet connection 88 of the pump. In this position, flow is closed through the valves to the manifold 96 and the pipe 84. Oil is then drawn from the barrel into the nozzle 102 through the hose 101, filter 100 and three-way valve 92 by suction of the pump 58, the oil being discharged from the pump through the discharge connection 61, three-way valve 85, manifold 96 and pipe 97 into the clean oil compartment 19.

After filling the compartment 19 with the desired quantity of fresh lubricant the clutch 123 is disengaged and the hose 101 is returned to the rear compartment 21, and the plug of the valve 92 is adjusted so as to close the manifold 96. The oil is thus retained in the fresh oil compartment and ready to service a lubricant oil using unit; for example, an airplane. After disengaging the power take-off, the vehicle is driven to the site of the airplane to be serviced.

After positioning the vehicle in convenient relation to the aircraft, the hose 55 is withdrawn from the reel in the rear compartment so that the funnel 120 thereof may be conveniently located over the drain opening of the oil compartment of the airplane. The plug of the three-way valve 106 is then adjusted so that the pipe 114 is in communication with the inlet of the pump 59 and the valve 107 is adjusted so that the inlet connection is in communication with the discharge connection of the pump and the outlet connection 110 is in communication with the pipe 115. Upon opening of the drain connection, the dirty oil flows into the funnel 120 and is drawn by suction of the pump through the hose 55 and pipe 114 and discharged through the pipe 115 into the used oil storage compartment 20. The hose carrying the funnel is then returned to the reel 48 and the hose on the reel 47 is withdrawn so that the nozzle 103 thereof may be inserted within the oil fill connection of the aircraft. The plug of the three-way valve 92 is then adjusted so that the inlet 93 thereof is in connection with the manifold 96 and the outlet 94 in connection with the inlet of the pump 58 and the plug of the valve 85 is adjusted so that the inlet 88 is in connection with the outlet 86. With these valve adjustments, flow is closed between the pump and the connections 93 and 87 thereof.

If the quantity of lubricating oil delivered to the airplane is to be measured, the valve 80 is closed and the valve 81 opened. The rod 125 is then actuated to engage the clutch 122 to drive the pump 58. With the pump 58 in operation, oil is drawn from the clean oil compartment 19 through the pipe 97, manifold 96 and valve 92 by the pump and discharged by the pump through the valve 85, pipe 84, air eliminator 90, meter 91, pipe 83 and valve 81 and discharged through the hose 54 and nozzle 103 to the airplane oil fill connection, the pump being operated until the meter shows that the desired amount of oil has been dispensed. The pump is then stopped and the valves readjusted to close flow from the clean oil compartment, after which the hose 54 is returned to the reel 47. The unit may then be driven to positions for servicing other planes until the supply of fresh oil in the compartment 19 has been exhausted and the compartment 20 filled with used oil.

The used oil in the compartment 20 is removed therefrom and discharged into a suitable storage. This is effected by withdrawing the hose 118 from the compartment 37 and inserting the nozzle 119 thereof into the inlet connection of the dirty oil storage. The plugs of the valves 106 and 107 are then positioned so that the pipe 112 connects with the inlet of the pump 59 and the discharge of the pump is in connection with the hose 118. Then, upon operation of the pump, dirty oil is emptied through the pipe 112 and valve 106 to the inlet of the pump and discharged by the pump through the valve 107, pipe 116 and hose 118 to storage.

From the foregoing, it is obvious that I have provided a lubricant oil servicing unit whereby aircraft and similar lubricant using equipment may be quickly and conveniently serviced, and that the servicing is accomplished without contamination of the clean lubricant with the dirty or used lubricant removed from the equipment being serviced. It is also obvious that the servicing unit may be completely assembled at the factory and shipped to remote points for mounting upon any motor vehicle chassis with a minimum of connections being made at the point of mounting.

What I claim and desire to secure by Letters Patent is:

1. A servicing unit of the character described including a tank having a compartment for containing a liquid to be dispensed and a pump compartment, a pump in the pump compartment having inlet and discharge connections, a three-way valve connected with the pump inlet connection, a three-way valve connected with the pump outlet connection, a duct connecting the liquid compartment with said three-way valves, a hose reel in the pump compartment, a hose adapted for winding on said reel, a duct means connecting the three-way valve on the discharge side of the pump with said hose, a meter in said duct, a duct by-passing the meter, valves in said ducts for selectively controlling flow through the meter and said by-pass to the hose, and a fill duct connected with the three-way valve on the inlet side of the pump.

2. A liquid servicing unit including a tank having a compartment for containing a liquid to be dispensed and having an interconnected pump compartment, a pump in the pump compartment having inlet and discharge connections, a three-way valve connected with the inlet connection of the pump, a three-way valve connected with the discharge connection of the pump, a reel mounted in the pump compartment, a hose adapted to be wound on the reel, a T connection with said hose and having oppositely disposed branches, shut-off valves connected with the respective branches, means for measuring the liquid, ducts connecting the respective valves with the inlet and discharge sides of said metering means, a duct connecting the three-way valve at the discharge connection of the pump with the inlet side of the metering means, a fill duct connected with the other three-way valve, and means for operating the pump.

WILLIAM J. SEIGEL.

REFERENCES CITED

The following references are of record in the file of this patent:

UNITED STATES PATENTS

| Number | Name | Date |
|---|---|---|
| 1,644,090 | Sawyer | Oct. 4, 1927 |
| 1,655,939 | Copeland | Jan. 10, 1928 |
| 1,909,733 | Thwaits | May 16, 1933 |
| 2,160,741 | Jensen | May 30, 1939 |
| 2,315,085 | Churchward | Mar. 30, 1943 |